United States Patent Office 3,763,191
Patented Oct. 2, 1973

3,763,191
PROCESS FOR THE PRODUCTION OF ANTHRA-QUINONE-α-SULPHONIC ACIDS
Reinold Schmitz, Blecher, and Klaus Alberti, Leverkusen, Germany, assignors to Bayer Aktiengesellschaft, Leverkusen, Germany
No Drawing. Filed Aug. 20, 1971, Ser. No. 173,658
Claims priority, application Germany, Aug. 21, 1970, P 20 41 547.8
Int. Cl. C09b 1/00
U.S. Cl. 260—370                                        6 Claims

ABSTRACT OF THE DISCLOSURE

Process for the production of anthraquinone-α-sulphonic acids by the sulphonation of anthraquinones with a free α-position in the presence of catalysts in solvents, optionally at an elevated temperature, characterised in that metals of the 1st or 8th subsidiary group of the Periodic System or compounds containing such metals are used as catalysts.

---

The subject-matter of the present invention is a process for the production of anthraquinone-α-sulphonic acids, especially anthraquinone-1-sulphonic acid, by the sulphonation of anthraquinones with a free α-position in the presence of catalysts in solvents, optionally at an elevated temperature, characterised in that metals of the 1st or 8th subsidiary group of the Periodic System or compounds containing such metals are used as catalysts.

In particular, the process is carried out by treating the anthraquinone at temperatures of about 25 to 350° C., preferably at 50 to 180° C., in suitable solvents, for example, inorganic acids such as phosphoric acid which may contain $P_2O_5$, fluoric acid, chlorosulphonic acid, fluorosulphonic acid, perchloric acid and, preferably, sulphuric acid; furthermore, in liquid $SO_3$, liquid $SO_2$ or melted salts such as $KHSO_4$ or $KH_3(SO_4)_2$, in the presence of about 0.005 to 5%, preferably 0.1 to 5%, of a metal of the 1st or 8th subsidiary group of the Periodic System or of a compound containing such a metal, referred to the weight of the starting anthraquinone, with preferably about 100 to 500 molar percent of a sulphonating agent, e.g. $SO_3$ or its complexes and addition compounds, chlorosulphonic acid, fluorosulphonic acid, concentrated sulphuric acid, esters of chlorosulphonic acid or dialkyl sulphonates such as dimethyl sulphate. The reaction times amount to about 5 minutes to 20 hours, preferably to about 1 to 6 hours, depending on the reaction temperature. The sulphonation can be carried out in a continuous or discontinuous operation.

Suitable catalysts are, for example, ruthenium, rhodium, palladium, osmium, iridium, platinum, silver, gold, cobalt or compounds containing these metals. Palladium and ruthenium or compounds containing these metals are particularly suitable and effective catalysts. The metals may be present in the metal compounds in different stages of oxidation. The most advantageous stage of oxidation can be adjusted during sulphonation by the addition of reducing or oxidizing agents, for example, hydrazine or persulphates such as potassium persulphate.

Suitable catalysts are, for example:

cobalt, especially as trivalent cobalt, e.g. as $Co(OH)_3$, $Co_2O_3$, $Co_3O_4$ or $K_3Co(NO_2)_6$;

nickel, especially as 3- and 4-valent nickel, e.g. as $Ni_2O_3$ aq. and $NiO_2$;
rhodium, metallic or in the form of $RhCl_3$, $K_3RhCl_6$;
silver, metallic or in the form of $Ag_2SO_4$ or as bivalent silver in the form of AgO;
osmium, metallic or in the form $K_2OsO_4$, $K_2OsCl_6$ or $OsO_4$;
iridium, metallic or in the form of $Ir_2O_3$, $IrO_2$, $K_2IrCl_6$, $K_3IrCl_6$;
platinum, metallic or in the form of $K_2PtCl_6$, $PtCl_4$, $PtO_2$, $PtCl_2$, $K_2PtCl_4$;
gold, metallic or in the form of $Au_2O$, $AuO(OH)$, $AuCl_3$, $HAuCl_4$.

The following have proved to be particularly effective catalysts:

ruthenium, metallic or in the form of $K_2RuO_4$, $KRuO_4$, $RuO_4$, $RuO_2$, $K_2RuCl_6$, $RuCl_3$ as well as ruthenium red $(RuOHCl \cdot xNH_3 \cdot yOH_2)$ and palladium, metallic or in the form of $PdCl_2$, PdO, $PdO_2$, $K_2PdCl_4$, $K_2PdCl_6$, $Pd(NH_3)_2Cl_2$.

The aforesaid catalysts are only a selection; it is also possible to use other compounds of the metals mentioned above, which differ from the above compounds, for example, in respect to the types of the compensating ion, the type of complex ligand as well as of the stage of oxidation. Instead of the individual compounds, there may, of course, also be used mixtures of the said compounds and also mixtures of the said compounds with mercury or thallium or their compounds.

It is already known that anthraquinone, when sulphonated in $SO_3$-containing sulphuric acid in the presence of mercury, mercury salts or thallium(III) salts, predominantly reacts in the 1-position with the formation of anthraquinone-1-sulphonic acid (see German Pat. No. 149,801). However, this sulphonation is not selective, that is to say that, in addition to about 9% 2-sulphonic acid, disulphonation already occurs to a considerable extent, even in the presence of an excess of anthraquinone, with the formation of anthraquinone-1,5- and anthraquinone-1,8-disulphonic acid and other disulphonation products. If it is desired to produce pure anthraquinone-1-sulphonic acid according to this process which corresponds to the present state of the art, then the reaction must be interrupted as soon as about 45% of the starting anhraquinone have been converted, since otherwise disulphonation will be predominant. Even under these conditions, however, there are only formed about 82% of theory of anthraquinone-1-sulphonic acid, referred to the reacted anthraquinone (i.e. about 35% of theory, referred to the starting anthraquinone). The remainder consists of about 9.5% of theory of anthraquinone-1,5- and anthraquinone-1,8-disulphonic acid and of about 8.5% of theory of anthraquinone-2-sulphonic acid, besides smaller amounts of isomeric disulphonic acids, referred to the reacted anthraquinone (cf. Ullmann, Enzyklopädie der technischen Chemie, 3rd edition [1953], vol. 3, p. 667).

In contrast thereto, the process according to the invention gives substantially higher yields of anthraquinone-1-sulphonic acid and substantially lower proportions of anthraquinone-2-sulphonic acid and anthraquinone-disulphonic acids, especially if palladium or compounds containing palladium are used.

With the use of $K_2RuCl_6$, for example, a mixture of about 83% of theory of anthraquinone-1-sulphonic acid, about 15% of theory of anthraquinone-2-sulphonic acid and about 1% of theory of anthraquinone-disulphonic acids is obtained with a degree of sulphonation of 48%; with the use of $K_2PdCl_6$, a mixture of about 95% of theory of anthraquinone-1-sulphonic acid, about 1.8% of theory of anthraquinone-2-sulphonic acid and about 2.4% of theory of anthraquinone-disulphonic acids is obtained with a degree of sulphonation of 85%.

EXAMPLE 1

0.64 g. $PdCl_2$ are introduced with stirring into 55 ml. of 20% oleum, the mixture is heated, and potassium persulphate is added, viz. 2 g. at 50° C. and 1 g. each at 70° C. and 120° C.; 30 g. anthraquinone are introduced at 120° C., the mixture is kept at 120° C. for 4 hours with the exclusion of moisture and then worked up in the usual way by dilution with water, filtration and salting out of the anthraquinone-1-sulphonic acid in the filtrate.

The resultant reaction product contains:

anthraquinone, unreacted (approx. 35% of theory)
anthraquinone-1-sulphonic acid (approx. 49% of theory)
anthraquinone-2-sulphonic acid (approx. 10% of theory)
anthraquinone-1,5-disulphonic acid (approx. 0.5% of theory)
anthraquinone-1,8-disulphonic acid (approx. 1% of theory)
anthraquinone-1,6-disulphonic acid (approx. 1% of theory)
anthraquinone - 1,7 - disulphonic acid (approx. 1% of theory)
anthraquinone-2,6-disulphonic acid (approx. 2% of theory)
total of acid byproducts (approx. 16% of theory)
degree of sulphonation (65%)

EXAMPLE 2

When the process is carried out as described in Example 1, but with the use of 0.4 g. Pd, instead of 0.64 g. $PdCl_2$, then there is obtained a reaction product containing the following components:

anthraquinone, unreacted (approx. 10% of theory)
anthraquinone-1-sulphonic acid (approx. 82% of theory)
anthraquinone-2-sulphonic acid (approx. 1.5% of theory)
anthraquinone-1,5-disulphonic acid (approx. 2.5% of theory)
anthraquinone-1,8-disulphonic acid (approx. 3% of theory)
anthraquinone-1,6-disulphonic acid (approx. 0.3% of theory)
anthraquinone-1,7-disulphonic acid (approx. 0.4% of theory)
anthraquinone-2,6-disulphonic acid (trace)
total of acid byproducts (approx. 8% of theory)
degree of sulphonation (90%)

EXAMPLE 3

1.5 g. $K_2PdCl_6$ are introduced with stirring into 55 ml. of 20% oleum, the mixture is heated to 120° C., 30 g. anthraquinone are added at 120° C., the mixture is kept at 120° C. for 1¾ hours with the exclusion of moisture, and then worked up in the usual way by dilution with water, filtration and salting out of the anthraquinone-1-sulphonic acid in the filtrate.

The resultant reaction product contains:

anthraquinone, unreacted (approx. 15% of theory)
anthraquinone-1-sulphonic acid (approx. 81% of theory)
anthraquinone-2-sulphonic acid (approx. 1.5% of theory)
anthraquinone-1,5-disulphonic acid (approx. 1% of theory)
anthraquinone-1,8-disulphonic acid (approx. 0.5% of theory)
anthraquinone-1,6-disulphonic acid (approx. 0.3% of theory)
anthraquinone-1,7-disulphonic acid (approx. 0.3% of theory)
anthraquinone-2,6-disulphonic acid (trace)
total of acid byproducts (approx. 4% of theory)
degree of sulphonation (85%)

EXAMPLE 4

A catalyst obtained by dissolving 1 g. $RuCl_3$ in 50 ml. of *aqua regia* and precipitation with 5 g. KCl (washed with water and methanol and dried; presumably $K_2RuCl_6$) is introduced into 100 ml. and 20% oleum, 100 g. anthraquinone are added, and the mixture is heated to 125° C. This temperature is maintained for one hour. The melt then contains:

anthraquinone, unreacted (approx. 52% of theory)
anthraquinone-1-sulphonic acid (approx. 40% of theory)
anthraquinone-2-sulphonic acid (approx. 7% of theory)
anthraquinone-1,5-disulphonic acid (approx. 0.25% of theory)
anthraquinone-1,6-disulphonic acid (approx. 0.25% of theory)
anthraquinone-1,7-disulphonic acid (approx. 0.25% of theory)
anthraquinone-2,6-disulphonic acid (approx. 0.25% of theory)
anthraquinone-1,8-disulphonic acid (trace)

When the $RuCl_3$ is replaced with a corresponding amount of $PdCl_2$, then there is obtained a reaction mixture containing the following components:

anthraquinone, unreacted (approx. 70% of theory)
anthraquinone-1-sulphonic acid (approx. 25% of theory)
anthraquinone-2-sulphonic acid (approx. 3% of theory)
anthraquinone-1,8-disulphonic acid (approx. 0.25% of theory)
anthraquinone-1,6-disulphonic acid (approx. 0.25% of theory)
anthraquinone-1,7-disulphonic acid (approx. 0.25% of theory)
anthraquinone-2,6-disulphonic acid (approx. 0.25% of theory)
anthraquinone-1,5-disulphonic acid (trace)

When the process is carried out under these reaction conditions without a catalyst, then the resultant reaction mixture contains 83% of theory of anthraquinone, 0.25% of theory of anthraquinone-1-sulphonic acid, 10 to 15% of theory of anthraquinone-2-sulphonic acid and 1% of theory of anthraquinone-disulphonic acids.

EXAMPLE 5

120 ml. of 20% oleum, 30 ml. of 65% oleum, 70 g. anthraquinone and 450 mg. $Pd(NH_3)_2Cl_2$ are heated at 118° C. for 135 minutes. 81% of the anthraquinone are thus sulphonated. The sulphonated anthraquinone consists of:

anthraquinone-1-sulphonic acid (76% of theory)
anthraquinone-2-sulphonic acid (4.5% of theory)
anthraquinone-disulphonic acids (19.5% of theory)

What is claimed is:

1. Process for the preparation of anthraquinone-α-sulfonic acid which comprises sulfonating anthraquinone at a temperature of 25°–350° C. in a solvent and in the presence of a metallic catalyst which is a free metal selected from the group consisting of ruthenium, rhodium, palladium, osmium, iridium, platinum, silver, gold, cobalt, and nickel, a compound of said metal, a mixture of compounds of said metals, and a mixture of a compound of said metal with mercury, thallium, mercury compound or thallium compound.

2. Process of claim 1 wherein the metal is palladium or ruthenium.

3. Process of claim 2 wherein the catalyst is Pd, $PdCl_2$, $K_2PdCl_6$, $Pd(NH_3)_2Cl_2$, or $K_2RuCl_6$.

4. Process of claim 1 wherein the solvent is an organic acid.

5. Process of claim 1 wherein the catalyst is present in the amount of 0.005% to 5% by weight of the anthraquinone employed as a starting material.

6. Process of claim 1 wherein said sulfonating comprises treating anthraquinone with 100 to 500 molar percent of a sulfonating agent selected from the class consisting of sulfur trioxide, sulfur trioxide complexes, sulfur trioxide addition compound, chlorosulfonic acid, fluorosulfonic acid, concentrated sulfuric acid, chlorosulfonic acid ester and dialkyl sulfonate.

References Cited
UNITED STATES PATENTS 3,079,404  2/1963  Donaldson et al. _____ 260—370

LORRAINE A. WEINBERGER, Primary Examiner

E. J. SKELLY, Assistant Examiner